United States Patent
Cowgill et al.

(10) Patent No.: US 9,309,803 B2
(45) Date of Patent: Apr. 12, 2016

(54) TURBOCHARGER COMPRESSOR TEMPERATURE CONTROL SYSTEMS AND METHODS

(71) Applicant: GM Global Technology Operations LLC, Detroit, MI (US)

(72) Inventors: Joshua D. Cowgill, Hartland, MI (US); Joel Cowgill, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 257 days.

(21) Appl. No.: 14/097,665

(22) Filed: Dec. 5, 2013

(65) Prior Publication Data

US 2015/0159545 A1 Jun. 11, 2015

(51) Int. Cl.
*F02D 23/00* (2006.01)
*F02B 33/44* (2006.01)
*F02B 33/00* (2006.01)
*F02M 25/07* (2006.01)
*F02B 37/00* (2006.01)
*F02B 37/18* (2006.01)
*F02B 37/22* (2006.01)
*F02B 37/12* (2006.01)
*F02B 39/16* (2006.01)

(52) U.S. Cl.
CPC ............ *F02B 37/002* (2013.01); *F02B 37/18* (2013.01); *F02B 37/22* (2013.01); *F02B 2037/122* (2013.01); *F02B 2039/164* (2013.01)

(58) Field of Classification Search
CPC ...... F02B 37/002; F02B 37/12; F02B 37/127; F02B 37/16; F02B 37/007; F02B 37/22; F02M 25/0707; F02M 25/0711; F02M 25/0713; F01N 13/107; F01N 2240/36; F02D 9/04; F02D 23/00; F02D 41/0007; F02D 2200/0414; F02D 2200/0416; F02D 2041/2027; Y02T 10/144
USPC ................. 60/602, 605.1, 605.2, 611, 612; 123/562, 568.12; 701/108
See application file for complete search history.

(56) References Cited

U.S. PATENT DOCUMENTS 2,773,348 A * 12/1956 Grieshaber et al. ............ 60/612
4,781,027 A * 11/1988 Richter et al. .................. 60/612
(Continued)

FOREIGN PATENT DOCUMENTS

DE 102006042443 A1 * 3/2008 .............. F02B 37/22
DE 102006061345 A1 * 4/2008 ............ F02B 37/007
(Continued)

OTHER PUBLICATIONS

U.S. Appl. No. 14/097,587, filed Dec. 5, 2013, Joshua D. Cowgill.

*Primary Examiner* — Thai Ba Trieu

(57) ABSTRACT

A control system for a vehicle includes a target boost module and a turbocharger control module. The target boost module determines a target boost for first and second turbochargers based on an engine torque request. Based on a temperature of a compressor of the second turbocharger, the turbocharger control module: selectively opens a first bypass valve that regulates exhaust bypassing a first turbine of the first turbocharger; and selectively closes a cutoff valve that regulates exhaust flow through both a second turbine of the second turbocharger and a second bypass valve. The second bypass valve regulates exhaust bypassing the second turbine of the second turbocharger.

20 Claims, 6 Drawing Sheets

(56) References Cited

U.S. PATENT DOCUMENTS

| | | | |
|---|---|---|---|
| 5,003,781 A * | 4/1991 | Shibata et al. | 60/612 |
| 5,005,359 A * | 4/1991 | Tashima et al. | 60/612 |
| 5,035,114 A * | 7/1991 | Shibata et al. | 60/612 |
| 5,036,663 A * | 8/1991 | Akagi et al. | 60/612 |
| 5,081,842 A * | 1/1992 | Sugiyama et al. | 60/612 |
| 5,083,543 A * | 1/1992 | Harada et al. | 60/612 |
| 5,144,803 A * | 9/1992 | Yoshioka et al. | 60/612 |
| 5,154,057 A * | 10/1992 | Yoshioka et al. | 60/612 |
| 5,154,058 A * | 10/1992 | Mizuno | 60/612 |
| 5,168,707 A * | 12/1992 | Yoshioka et al. | 60/612 |
| 5,186,005 A * | 2/1993 | Yoshioka et al. | 60/612 |
| 5,197,287 A * | 3/1993 | Okimoto et al. | 60/600 |
| 5,289,684 A * | 3/1994 | Yoshioka et al. | 60/612 |
| 5,313,798 A * | 5/1994 | Yoshioka et al. | 60/612 |
| 5,351,486 A * | 10/1994 | Yoshioka et al. | 60/612 |
| 7,895,838 B2 * | 3/2011 | Ono | 60/605.2 |
| 8,006,494 B2 * | 8/2011 | Nagae | 60/605.2 |
| 8,196,404 B2 * | 6/2012 | Onishi et al. | 60/605.2 |
| 8,220,443 B2 * | 7/2012 | Murata et al. | 60/605.2 |
| 2006/0021347 A1 * | 2/2006 | Sun et al. | 60/612 |
| 2010/0011762 A1 * | 1/2010 | Hokuto et al. | 60/602 |
| 2012/0240557 A1 * | 9/2012 | Kawaguchi et al. | 60/278 |
| 2012/0317958 A1 * | 12/2012 | Karcher | 60/273 |
| 2013/0118166 A1 * | 5/2013 | Bjorge et al. | 60/605.2 |
| 2013/0125542 A1 * | 5/2013 | Hayakawa | 60/602 |
| 2013/0131953 A1 * | 5/2013 | Luft et al. | 60/602 |
| 2013/0167528 A1 * | 7/2013 | Schlund et al. | 60/612 |
| 2014/0076279 A1 * | 3/2014 | Livshiz et al. | 123/403 |
| 2014/0278009 A1 * | 9/2014 | Cowgill et al. | 701/105 |

FOREIGN PATENT DOCUMENTS

| | | | | |
|---|---|---|---|---|
| DE | 102010037186 A1 * | 12/2011 | | F02B 37/007 |
| FR | 2892460 A1 * | 4/2007 | | F02B 37/007 |
| JP | 07293262 A * | 11/1995 | | F02B 37/12 |

* cited by examiner

TURBOCHARGER COMPRESSOR TEMPERATURE CONTROL SYSTEMS AND METHODS

FIELD

The present disclosure relates to internal combustion engines and more particularly to turbocharger temperature control systems and methods.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to produce drive torque. The engine outputs exhaust to an exhaust system. In some engines, the cylinders may be arranged in two cylinder banks. One bank of cylinders outputs exhaust to a first exhaust pipe, and the other bank of cylinders outputs exhaust to a second exhaust pipe.

Some engines include one or more turbochargers. Each turbocharger includes a turbine and a compressor. Exhaust drives the turbine, and the turbine drives the compressor. The compressor pumps air into the engine for combustion. An engine including one or more turbochargers can therefore produce more power than a naturally aspirated engine of similar displacement.

SUMMARY

A control system for a vehicle includes a target boost module and a turbocharger control module. The target boost module determines a target boost for first and second turbochargers based on an engine torque request. Based on a temperature of a compressor of the second turbocharger, the turbocharger control module: selectively opens a first bypass valve that regulates exhaust bypassing a first turbine of the first turbocharger; and selectively closes a cutoff valve that regulates exhaust flow through both a second turbine of the second turbocharger and a second bypass valve. The second bypass valve regulates exhaust bypassing the second turbine of the second turbocharger.

In further features, when the temperature of the compressor of the second turbocharger is greater than a predetermined temperature, the turbocharger control module: selectively opens the first bypass valve; and selectively closes the cutoff valve.

In still further features, when the temperature of the compressor of the second turbocharger is greater than the predetermined temperature, the turbocharger control module: opens the first bypass valve by a first predetermined amount; and closes the cutoff valve by a second predetermined amount.

In yet further features, when the temperature of the compressor of the second turbocharger is less than the predetermined temperature, the turbocharger control module: selectively closes the first bypass valve; and selectively opens the cutoff valve.

In further features, when the temperature of the compressor of the second turbocharger is less than the predetermined temperature, the turbocharger control module: closes the first bypass valve by a third predetermined amount; and selectively opens the cutoff valve by a fourth predetermined amount.

In still further features, when the cutoff valve is at least partially open and the temperature of the compressor of the second turbocharger is greater than a predetermined temperature, the turbocharger control module: selectively opens the first bypass valve; and selectively closes the cutoff valve.

In yet further features, the turbocharger control module: generates first, second, and third target openings based on the target boost; generates first and second adjustments based on the temperature of the compressor of the second turbocharger; generates a fourth target opening based on the first target opening and the first adjustment; generates a fifth target opening based on the second target opening and the second adjustment; and controls the first bypass valve, the cutoff valve, and the second bypass valve based on the fourth target opening, the fifth target opening, and the third target opening, respectively.

In further features, when the temperature of the compressor is greater than a predetermined temperature, the turbocharger control module selectively increases the first adjustment and decreases the second adjustment.

In still further features, when the temperature of the compressor is less than the predetermined temperature, the turbocharger control module selectively decreases the first adjustment and increases the second adjustment.

In yet further features, the turbocharger control module: sets the fourth target opening equal to one of a product of and a sum of the first target opening and the first adjustment; and sets the fifth target opening equal to one of a product of and a sum of the second target opening and the second adjustment.

A control method for a vehicle includes: determining a target boost for first and second turbochargers based on an engine torque request. The control method further includes, based on a temperature of a compressor of the second turbocharger: selectively opening a first bypass valve that regulates exhaust bypassing a first turbine of the first turbocharger; and selectively closing a cutoff valve that regulates exhaust flow through both a second turbine of the second turbocharger and a second bypass valve. The second bypass valve regulates exhaust bypassing the second turbine of the second turbocharger.

In further features, the control method further includes, when the temperature of the compressor of the second turbocharger is greater than a predetermined temperature: selectively opening the first bypass valve; and selectively closing the cutoff valve.

In still further features, the control method further includes, when the temperature of the compressor of the second turbocharger is greater than the predetermined temperature: opening the first bypass valve by a first predetermined amount; and closing the cutoff valve by a second predetermined amount.

In yet further features, the control method further includes, when the temperature of the compressor of the second turbocharger is less than the predetermined temperature: selectively closing the first bypass valve; and selectively opening the cutoff valve.

In further features, the control method further includes, when the temperature of the compressor of the second turbocharger is less than the predetermined temperature: closing the first bypass valve by a third predetermined amount; and selectively opening the cutoff valve by a fourth predetermined amount.

In still further features, the control method further includes, when the cutoff valve is at least partially open and the temperature of the compressor of the second turbocharger is greater than a predetermined temperature: selectively opening the first bypass valve; and selectively closing the cutoff valve.

In further features, the control method further includes: generating first, second, and third target openings based on the target boost; generating first and second adjustments based on the temperature of the compressor of the second turbocharger; generating a fourth target opening based on the first target opening and the first adjustment; generating a fifth target opening based on the second target opening and the second adjustment; and controlling the first bypass valve, the cutoff valve, and the second bypass valve based on the fourth target opening, the fifth target opening, and the third target opening, respectively.

In still further features, the control method further includes, when the temperature of the compressor is greater than a predetermined temperature, selectively increasing the first adjustment and decreasing the second adjustment.

In yet further features, the control method further includes, when the temperature of the compressor is less than the predetermined temperature, selectively decreasing the first adjustment and increasing the second adjustment.

In further features, the control method further includes: setting the fourth target opening equal to one of a product of and a sum of the first target opening and the first adjustment; and setting the fifth target opening equal to one of a product of and a sum of the second target opening and the second adjustment.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine combusts air and fuel within cylinders to generate drive torque. A first sub-set of the cylinders output exhaust to a first exhaust pipe, and a second sub-set of the cylinders output exhaust to a second exhaust pipe. A first turbine of a first turbocharger is connected to the first exhaust pipe, and a second turbine of a second turbocharger is connected to the second exhaust pipe. Compressors of the first and second turbochargers provide compressed air to the engine.

A crossover pipe is connected upstream of the first and second turbines. A first bypass valve regulates exhaust bypassing the first turbine, and a second bypass valve regulates exhaust bypassing the second turbine. A cutoff valve is connected downstream of the second turbine and regulates exhaust flow through the second turbine and the second bypass valve.

An engine control module (ECM) controls the first and second bypass valves and the cutoff valve to control the first and second turbochargers sequentially. More specifically, only the first turbocharger may be used to provide boost under lower engine speed and both the first and second turbochargers may be used to provide boost under higher engine speed and load conditions.

While only the first turbocharger is providing boost, however, the ECM controls the first and second bypass valves and the cutoff valve such that the second turbocharger spins to prepare the second turbocharger to begin providing boost. This may decrease the period necessary for the second turbocharger to begin providing boost.

However, a temperature of the compressor of the second turbocharger may increase as the second turbocharger spins in preparation to provide boost. The ECM of the present disclosure therefore opens the first bypass valve and closes the cutoff valve when the temperature of the compressor of the second turbocharger is greater than a predetermined temperature. Closing the cutoff valve decreases exhaust flow through the second turbine and decreases the temperature of the compressor to protect the second turbocharger. Closing the cutoff valve also forces exhaust flow from the second exhaust pipe to the first exhaust pipe through the crossover pipe. Opening the first bypass valve increases exhaust flow bypassing the first turbine.

Figure 1:
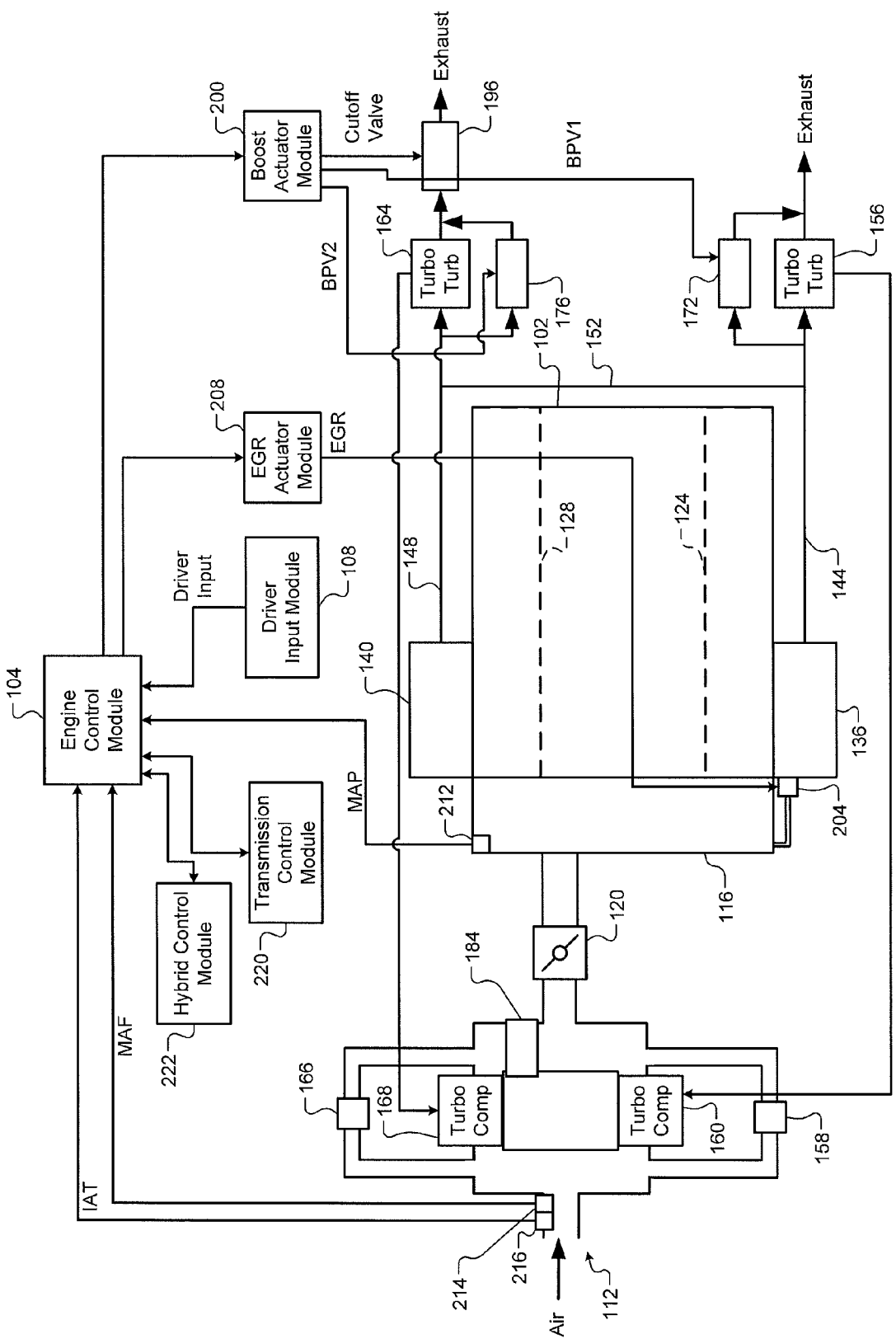
FIG. 1 is a functional block diagram of an example engine and exhaust system according to the present disclosure.

Referring now to FIG. 1, a functional block diagram of an example engine and exhaust system is presented. The system includes an engine 102 and an engine control module (ECM) 104. The engine 102 combusts an air/fuel mixture to produce drive torque for a vehicle. The ECM 104 controls the engine 102 based on driver input received from a driver input module 108. Air is drawn into the engine 102 through an intake system 112. For example only, the intake system 112 may include an intake manifold 116 and a throttle valve 120. For example only, the throttle valve 120 may include a butterfly valve having a rotatable blade. The ECM 104 controls an opening of the throttle valve 120 to control the amount of air drawn into the intake manifold 116.

Air from the intake manifold 116 is drawn into cylinders (not shown) of the engine 102. The engine 102 may include one or multiple cylinders. For example only, the engine 102 may include 2, 3, 4, 5, 6, 8, 10, and/or 12 cylinders. Under some circumstances, the ECM 104 may selectively deactivate one or more of the cylinders, which may improve fuel economy under certain engine operating conditions.

The engine 102 may operate using a four-stroke cycle. The four strokes are named the intake stroke, the compression stroke, the combustion stroke, and the exhaust stroke. During each revolution of a crankshaft (not shown), two of the four strokes occur within the cylinder. Therefore, two crankshaft revolutions are necessary for the cylinder to experience all four of the strokes.

The injected fuel mixes with air and creates an air/fuel mixture in the cylinder. During the compression stroke, a piston (not shown) within the cylinder compresses the air/fuel mixture. The engine 102 may be a compression-ignition engine, in which case compression in the cylinder ignites the air/fuel mixture. Alternatively, the engine 102 may be a spark-ignition engine, in which case a signal from the ECM 104 energizes a spark plug in the cylinder, which ignites the air/fuel mixture. The timing of the spark may be specified relative to the time when the piston is at its topmost position, referred to as top dead center (TDC).

The timing of the spark may be controlled by a timing signal specifying how far before or after TDC to generate the spark. Because piston position is directly related to crankshaft rotation, spark timing may be synchronized with the crankshaft angle. In various implementations, spark to deactivated cylinders may be halted.

The engine 102 may have two banks of cylinders. A first bank 124 of cylinders of the engine 102 outputs exhaust to a first exhaust manifold 136. A second bank 128 of cylinders of the engine 102 outputs exhaust to a second exhaust manifold 140.

The first exhaust manifold 136 outputs the exhaust from the first bank 124 of cylinders to a first exhaust pipe 144. The second exhaust manifold 140 outputs the exhaust from the second bank 128 of cylinders to a second exhaust pipe 148. A crossover pipe 152 is connected between the first and second exhaust pipes 144 and 148. Exhaust can flow from the first exhaust pipe 144 to the second exhaust pipe 148 through the crossover pipe 152 and vice versa.

The system includes first and second turbochargers that provide pressurized air to the intake manifold 116. The first and second turbochargers may be single scroll turbochargers or another suitable type of turbocharger. The first turbocharger includes a first turbine 156 and a first compressor 160. The second turbocharger includes a second turbine 164 and a second compressor 168.

Exhaust flow through the first turbine 156 drives the first turbine 156, and exhaust flow through the second turbine 164 drives the second turbine 164. A first turbine bypass valve 172 (or wastegate) may enable exhaust to bypass the first turbine 156. A second turbine bypass valve 176 (or wastegate) may enable exhaust to bypass the second turbine 164. While the first and second turbine bypass valves 172 and 176 are shown as being external to the first and second turbines 156 and 164, the first and second turbine bypass valves 172 and 176 may be implemented within housings of the first and second turbines 156 and 164, respectively.

The first and second turbines 156 and 164 are located downstream of the locations where the crossover pipe 152 joins the first and second exhaust pipes 144 and 148. In other words, the crossover pipe 152 is connected between the first and second exhaust pipes 144 and 148 upstream of the first and second turbines 156 and 164.

The first turbine 156 is mechanically coupled to the first compressor 160, and the first turbine 156 drives rotation of the first compressor 160. The first compressor 160 provides compressed air to the throttle valve 120. A first compressor bypass valve 158 may enable air to bypass the first compressor 160. The second turbine 164 is mechanically coupled to the second compressor 168, and the second turbine 164 drives rotation of the second compressor 168. The second compressor 168 also provides compressed air to the throttle valve 120. A second compressor bypass valve 166 may enable air to bypass the second compressor 168.

A one-way valve 184 may enable airflow from the second compressor 168 to the throttle valve 120 when the pressure at the input of the one-way valve 184 (i.e., the output of the second compressor 168) is greater than the pressure at the output of the one-way valve 184. The one-way valve 184 may block airflow from the second compressor 168 to the throttle valve 120 when the pressure at the input of the one-way valve 184 (i.e., the output of the second compressor 168) is less than the pressure at the output of the one-way valve 184. For example only, the one-way valve 184 may be a Reed valve or another suitable type of one-way valve.

A cutoff valve 196 varies exhaust flow through the cutoff valve 196. The cutoff valve 196 also varies exhaust flow through the second turbine bypass valve 176, the second turbine 164, and the crossover pipe 152. When the cutoff valve 196 is actuated to cut off exhaust flow, the exhaust from the second bank of cylinders is directed to the first exhaust pipe 144 through the crossover pipe 152. The cutoff valve 196 may be actuated to cut off exhaust flow, for example, to reduce or prevent exhaust flow through the second turbine 164. Reducing exhaust flow through the second turbine 164 reduces the output of the second compressor 168 and vice versa.

The ECM 104 may control boost (e.g., amount of intake air compression) provided by the first and/or second turbochargers via a boost actuator module 200. More specifically, the ECM 104 may control the cutoff valve 196 and the first and second turbine bypass valves 172 and 176 via the boost actuator module 200. For example, the boost actuator module 200 may control openings of the first turbine bypass valve 172, the second turbine bypass valve 176, and the cutoff valve 196 to control the first and second turbochargers. The boost actuator module 200 may also control opening of the first and second compressor bypass valves 158 and 166.

The system may also include an exhaust gas recirculation (EGR) valve 204 that selectively redirects exhaust gas back to the intake manifold 116. An EGR actuator module 208 may control the EGR valve 204 based on signals from the ECM 104.

A pressure within the intake manifold 116 may be measured using a manifold absolute pressure (MAP) sensor 212. In various implementations, engine vacuum, which may refer to a difference between ambient air pressure and the pressure within the intake manifold 116, may be measured. A mass air flowrate (MAF) sensor 214 measures a mass air flowrate into the intake manifold 116. In various implementations, one MAF sensor may be provided for each bank of cylinders.

An ambient temperature of air flowing into the engine 102 may be measured using an intake air temperature (IAT) sensor 216. A pressure within the cylinder may be measured using a cylinder pressure sensor. A cylinder pressure sensor may be provided for each cylinder. The ECM 104 may use signals from the sensors to make control decisions for the engine system.

The ECM 104 may communicate with a transmission control module 220 to coordinate shifting gears in a transmission (not shown). For example, the ECM 104 may reduce engine torque during a gear shift. The ECM 104 may communicate with a hybrid control module 222 to coordinate operation of the engine 102 and an electric motor (not shown).

Figure 2:
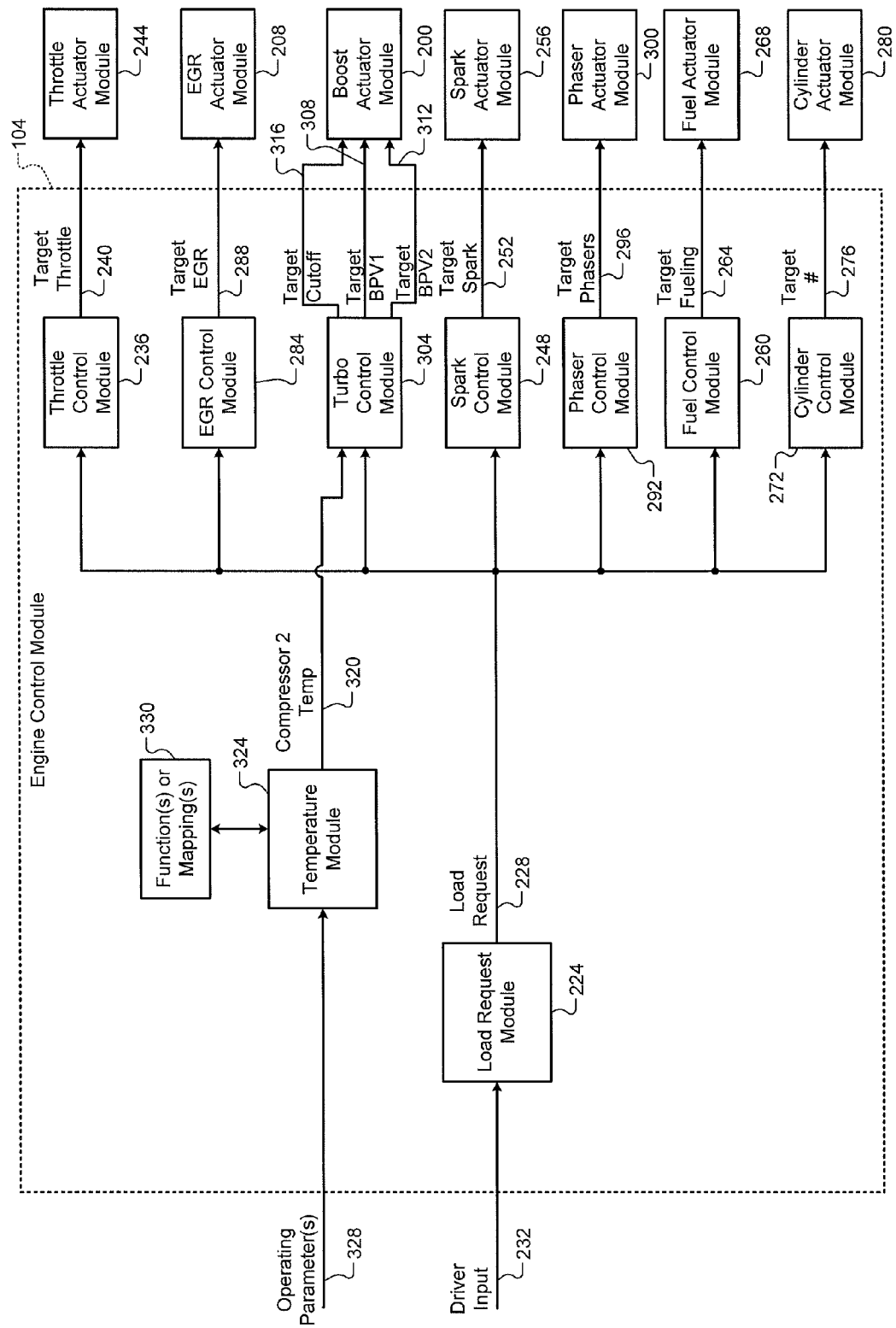
FIG. 2 is a functional block diagram of an example engine control module according to the present disclosure.

Referring now to FIG. 2, a functional block diagram of an example implementation of the ECM 104 is presented. A load request module 224 may determine a load request 228 based on one or more driver inputs 232, such as an accelerator pedal position, a brake pedal position, a cruise control input, and/or one or more other suitable driver inputs. The load request module 224 may determine the load request 228 additionally or alternatively based on one or more other requests, such as torque requests generated by the ECM 104 and/or torque requests received from other modules of the vehicle, such as the transmission control module 220, the hybrid control module, a chassis control module, etc. One or more engine actuators may be controlled based on the load request 228 and/or one or more other vehicle operating parameters. For example only, the load request 228 may correspond to an amount of air per cylinder (APC), a torque request, or another suitable parameter.

For example, a throttle control module 236 may determine a target throttle opening 240 based on the load request 228. A throttle actuator module 244 may adjust opening of the throttle valve 120 based on the target throttle opening 240. A spark control module 248 may determine a target spark timing 252 based on the load request 228. A spark actuator module 256 may generate spark based on the target spark timing 252.

A fuel control module 260 may determine one or more target fueling parameters 264 based on the load request 228. For example, the target fueling parameters 264 may include number of fuel injection pulses (per combustion event), timing for each pulse, and amount for each pulse. A fuel actuator module 268 may inject fuel based on the target fueling parameters 264.

A cylinder control module 272 may determine a target number of cylinders to deactivate and/or deactivate 276 based on the load request 228. A cylinder actuator module 280 may activate and deactivate cylinders of the engine 102 based on the target number 276. An EGR control module 284 may determine a target EGR opening 288 for the EGR valve 204 based on the load request 228. The EGR actuator module 208 may control the EGR valve 204 based on the target EGR opening 288.

A phaser control module 292 may determine target phaser positions 296 for intake and exhaust camshafts. A phaser actuator module 300 controls phasing of the intake and exhaust camshafts via intake and exhaust cam phasers based on the target phaser positions 296. In various implementations, camless valve actuators may be used.

A turbocharger control module 304 (see also FIGS. 3A-3B) determines a first target bypass valve (BPV) opening (denoted target BPV1 in the drawings) 308, a second target bypass valve opening (denoted target BPV2 in the drawings) 312, and a target cutoff valve opening (target cutoff) 316 based on the load request 228. The boost actuator module 200 controls the first turbine bypass valve 172 based on the first target BPV opening 308. The boost actuator module 200 controls the second turbine bypass valve 176 based on the second target BPV opening 312. The boost actuator module 200 controls the cutoff valve 196 based on the target cutoff valve opening 316. For example, the boost actuator module 200 may control the first turbine bypass valve 172, the second turbine bypass valve 176, and the cutoff valve 196 using pulse width modulation (PWM) or in another suitable manner.

The turbocharger control module 304 may selectively adjust the first target BPV opening 308, the second target BPV opening 312, and/or the target cutoff valve opening 316 based on a compressor temperature 320. The compressor temperature 320 corresponds to a temperature of the second compressor 168.

A temperature module 324 may determine the compressor temperature 320 based on one or more engine operating parameters 328. For example only, the temperature module 324 may determine the compressor temperature based on engine speed, a pressure at an inlet of the second compressor 168, a pressure at an outlet of the second compressor 168, an opening of the second turbine bypass valve 176, and/or an opening of the cutoff valve 196. The temperature module 324 may determine the compressor temperature 320 using one or more functions or mappings 330. The engine operating parameters 328 may be measured using sensors or determined based on one or more other parameters. In various implementations, the second target BPV opening 312 and the target cutoff valve opening 316 may be used as the opening of the second turbine bypass valve 176 and the opening of the cutoff valve 196, respectively. In various implementations, the compressor temperature 320 may instead be measured using a sensor. A rate of change of the compressor temperature 320 may also be determined.

Figure 3A:
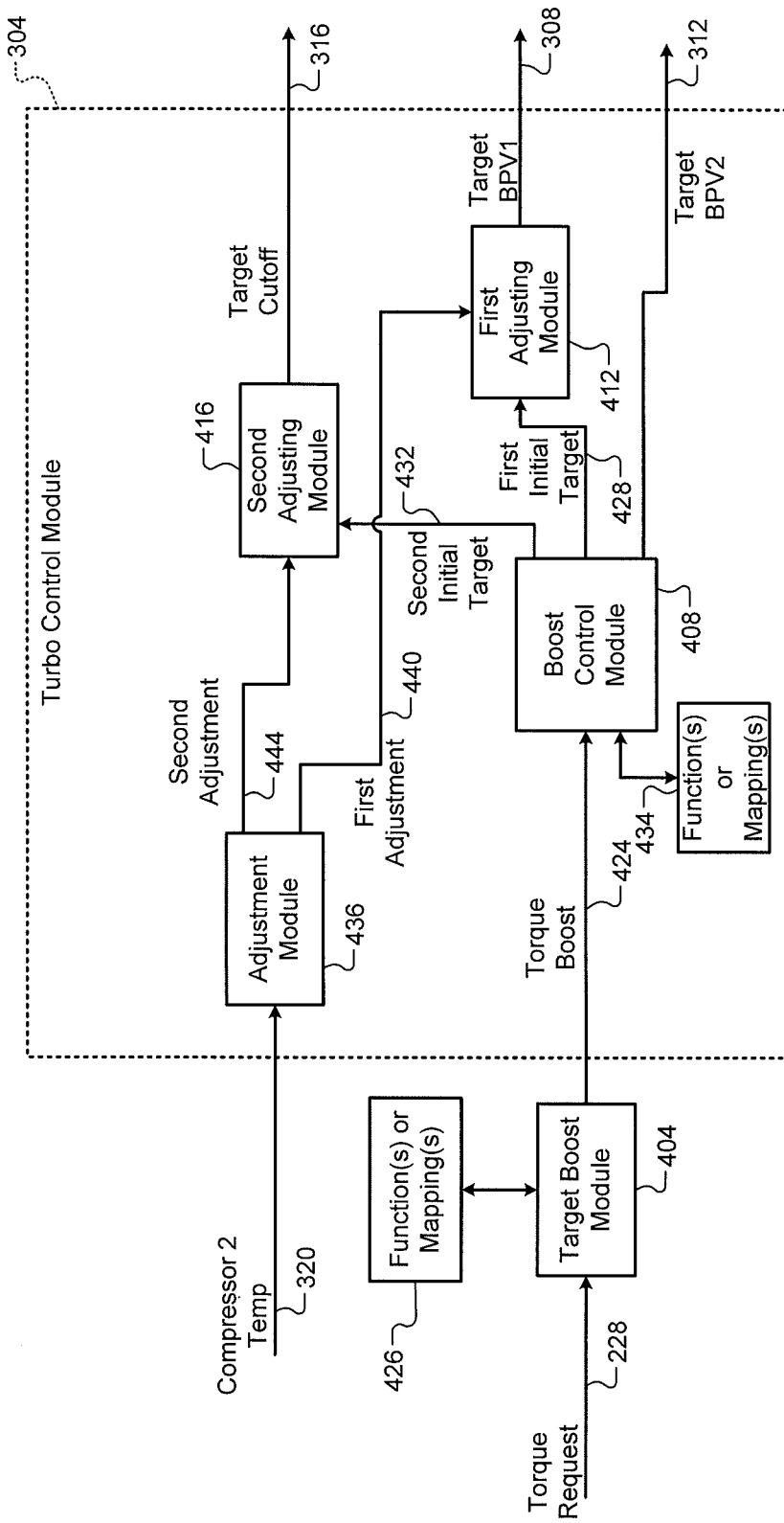
FIGS. 3A and 3B are functional block diagrams of example turbocharger control modules according to the present disclosure.

Referring now to FIG. 3A, a functional block diagram of an example implementation of the turbocharger control module 304 is presented. The turbocharger control module 304 includes a boost control module 408, a first adjusting module 412, and a second adjusting module 416.

A target boost module 404 of the ECM 104 determines a target boost 424 based on the load request 228. The target boost module 404 may determine the target boost 424, for example, using one or more functions or mappings 426 that relate the load request 228 to the target boost 424. The target boost module 404 may determine the target boost 424 based on one or more other parameters.

The first target BPV opening 308, the second target BPV opening 312, and the target cutoff valve opening 316 are set to together based on the target boost 424 such that the first and second turbochargers together achieve the target boost 424. The first target BPV opening 308, the second target BPV opening 312, and the target cutoff valve opening 316 are set to control the first and second turbochargers sequentially. Sequentially controlling the first and second turbochargers may refer to using only the first turbocharger to provide boost when an engine load is less than a predetermined load and using both of the first and second turbochargers to provide boost when the engine load is greater than the predetermined load.

The output of the first compressor 160 can be adjusted by adjusting the first turbine bypass valve 172 and/or by adjusting the cutoff valve 196. For example, the first target BPV opening 308 may be decreased to increase the output of the first compressor 160 and vice versa. Additionally or alternatively, the target cutoff valve opening 316 may be decreased to increase the output of the first compressor 160 and vice versa.

The boost actuator module 200 closes the first turbine bypass valve 172 as the first target BPV opening 308 decreases and vice versa. Closing the first turbine bypass valve 172 forces more exhaust to flow through the first turbine 156, thereby increasing the rotational speeds of the first turbine 156 and the first compressor 160 and increasing the output of the first compressor 160.

The boost actuator module 200 closes the cutoff valve 196 as the target cutoff valve opening 316 decreases and vice versa. Closing the cutoff valve 196 forces more exhaust to flow through the first turbine 156, thereby increasing the rotational speeds of the first turbine 156 and the first compressor 160 and increasing the output of the first compressor 160. Closing the cutoff valve 196 also decreases exhaust flow through the second turbine 164, thereby decreasing the rotational speed of the second turbine 164 and the second compressor 168 and decreasing the output of the second compressor 168.

While the first turbocharger is being used to provide boost, the second turbocharger may be controlled to a greatest speed possible. As described above, the one-way valve 184 does not open until the pressure at the output of the second compressor 168 is greater than the pressure at the output of the one-way valve 184. Controlling the second turbocharger to the greatest speed possible prepares the second turbocharger to provide boost and minimizes lag associated with the second turbocharger providing boost.

Output of the second compressor 168 can be adjusted by adjusting the second turbine bypass valve 176 and/or by adjusting the cutoff valve 196. For example, the second target BPV opening 312 may be decreased to increase the output of the second compressor 168 and vice versa. Additionally or alternatively, the target cutoff valve opening 316 may be decreased to decrease the output of the second compressor 168 and vice versa.

The boost actuator module 200 closes the second turbine bypass valve 176 as the second target BPV opening 312 decreases and vice versa. Closing the second turbine bypass valve 176 forces more exhaust to flow through the second turbine 164, thereby increasing the rotational speed of the second turbine 164 and the second compressor 168 and increasing the output of the second compressor 168.

While the second compressor 168 is spinning (due to exhaust flowing through the second turbine 164 resulting from the cutoff valve 196 being open to some extent) and the one-way valve 184 is fully closed, air from the output of the second compressor 168 recirculates back to the input of the second compressor 168. Under some circumstances, however, the compressor temperature 320 may approach or become greater than a predetermined temperature when the second compressor 168 is spinning and the one-way valve 184 is closed. The second turbocharger may be damaged when the compressor temperature 320 is greater than the predetermined temperature.

The turbocharger control module 304 therefore opens the first turbine bypass valve 172 and closes the cutoff valve 196 when the compressor temperature 320 is greater than the predetermined temperature while the second compressor 168 is spinning and the one-way valve 184 is closed. Opening the first turbine bypass valve 172 and closing the cutoff valve 196 decreases the compressor temperature 320. Additionally or alternatively, the turbocharger control module 304 may adjust the second turbine bypass valve 176 when the compressor temperature 320 is greater than the predetermined temperature while the second compressor 168 is spinning and the one-way valve 184 is closed, as discussed below in conjunction with FIG. 3B.

The boost control module 408 may determine the second target BPV opening 312, a first initial target opening 428, and a second initial target opening 432 together based on the target boost 424. For example, the boost control module 408 may determine the second target BPV opening 312, the first initial target opening 428, and the second initial target opening 432 using one or more functions or mappings 434 that relate the target boost 424 to the second target BPV opening 312, the first initial target opening 428, and the second initial target opening 432. As discussed below, the first initial target opening 428 and the second initial target opening 432 are used to determine the first target BPV opening 308 and the target cutoff valve opening 316, respectively. The one or more functions or mappings 434 are calibrated such that the first and second turbochargers are controlled sequentially.

An adjustment module 436 determines a first adjustment 440 and a second adjustment 444 based on the compressor temperature 320. Determination of the first and second adjustments 440 and 444 is discussed further below.

The first adjusting module 412 adjusts the first initial target opening 428 based on the first adjustment 440 to generate the first target BPV opening 308. For example only, the first adjusting module 412 may set the first target BPV opening 308 equal to a product of the first initial target opening 428 and the first adjustment 440 or equal to a sum of the first initial target opening 428 and the first adjustment 440.

The second adjusting module 416 adjusts the second initial target opening 432 based on the second adjustment 444 to generate the target cutoff valve opening 316. For example only, the second adjusting module 416 may set the target cutoff valve opening 316 equal to a product of the second initial target opening 432 and the second adjustment 444 or equal to a sum of the second initial target opening 432 and the second adjustment 444.

When the compressor temperature 320 is less than a predetermined temperature, the adjustment module 436 may decrease the first and second adjustments 440 and 444. For example, the adjustment module 436 may adjust the first and second adjustments 440 and 444 toward or to predetermined values that do not cause an adjustment of the respective initial target opening. For example only, when a product of an initial target opening and an adjustment is used, the predetermined value may be 1.0. When a sum of an initial target opening and an adjustment is used, the predetermined value may be 0.0. The predetermined temperature may be, for example, approximately 180 degrees Celsius (° C.)-approximately 200° C. or another suitable temperature above which a turbocharger may be damaged.

When the compressor temperature 320 is greater than the predetermined temperature, the adjustment module 436 sets the first adjustment 440 to increase the first target BPV opening 308 and sets the second adjustment 444 to decrease the target cutoff valve opening 316. For example, when a product of an initial target opening and an adjustment is used, the adjustment module 436 may set an adjustment to greater than 1.0 to cause an increase and set an adjustment to less than 1.0 to cause a decrease. When a sum of an initial target opening and an adjustment is used, the adjustment module 436 may set an adjustment to greater than 0.0 to cause an increase and set an adjustment to less than 0.0 to cause a decrease.

The adjustment module 436 may increase the first adjustment 440 and decrease the second adjustment 444 when the compressor temperature 320 is greater than the predetermined temperature. The adjustment module 436 may further increase the first adjustment 440 and decrease the second adjustment 444 over time when the compressor temperature 320 remains greater than the predetermined temperature. Increasing the first adjustment 440 and decreasing the second adjustment 444 causes opening of the first turbine bypass valve 172 and closing of the cutoff valve 196. This decreases exhaust flow through the second turbine 164 and increases exhaust bypassing the first turbine 156 to decrease the compressor temperature 320.

Figure 3B:
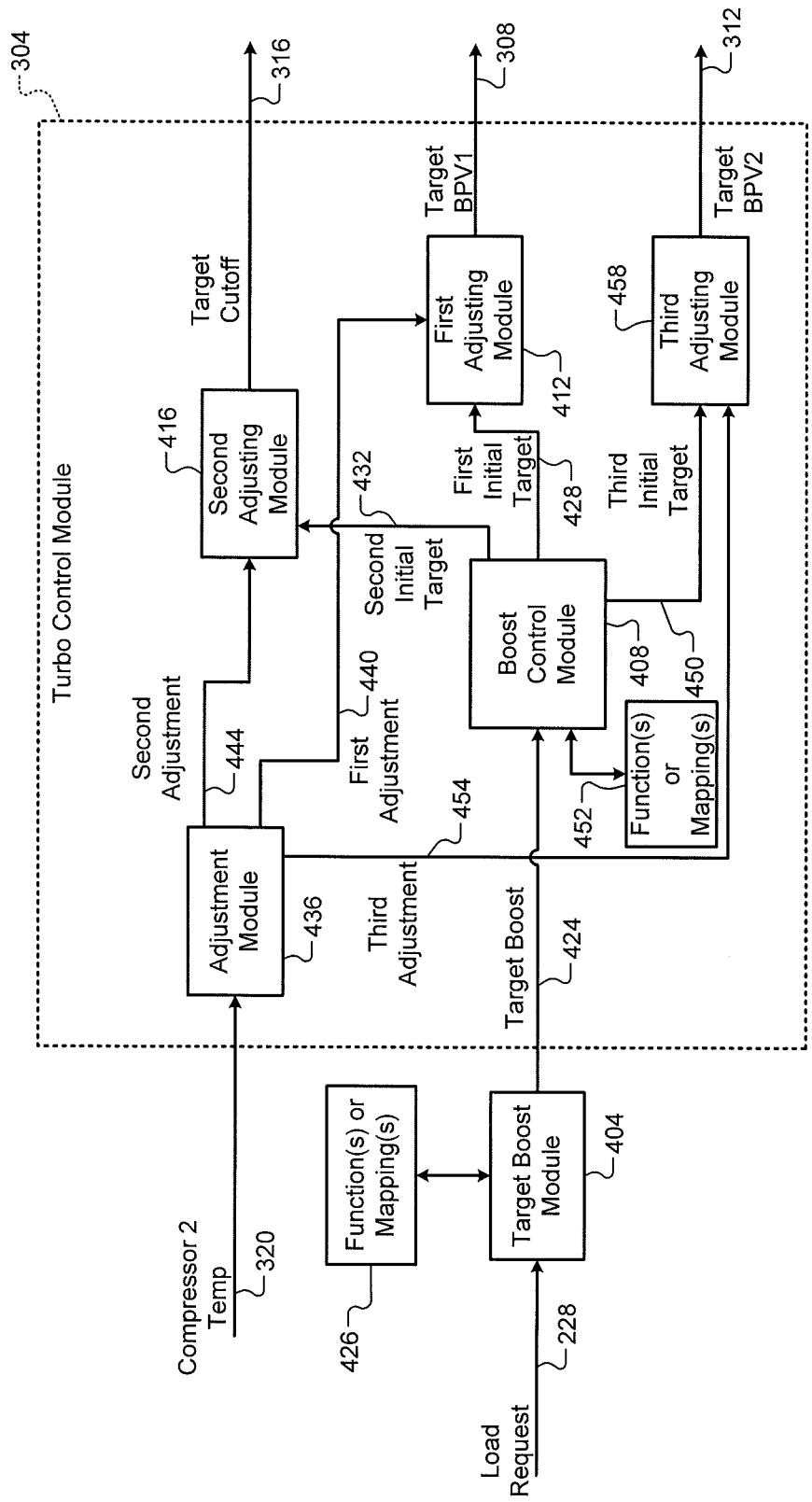

Additionally or alternatively to adjusting the first and second initial target openings 428 and 432, the second target BPV opening 312 may be adjusted based on the compressor temperature 320. Referring now to FIG. 3B, the boost control module 408 may determine the first initial target opening 428, the second initial target opening 432, and a third initial target opening 450 together based on the target boost 424. For example, the boost control module 408 may determine the first initial target opening 428, the second initial target opening 432, and the third initial target opening 450 using one or more functions or mappings 452 that relate the target boost 424 to the first initial target opening 428, the second initial target opening 432, and the third initial target opening 450. As discussed below, the third initial target opening 450 may be used to determine the second target BPV opening 312. The one or more functions or mappings 452 are calibrated such that the first and second turbochargers are controlled sequentially.

The adjustment module 436 may determine a third adjustment 454 based on the compressor temperature 320. Determination of the third adjustment 454 is discussed further below.

A third adjusting module 458 adjusts the third initial target opening 450 based on the third adjustment 454 to generate the second target BPV opening 312. For example only, the third adjusting module 458 may set the second target BPV opening 312 equal to a product of the third initial target opening 450 and the third adjustment 454 or equal to a sum of the third initial target opening 450 and the third adjustment 454.

When the compressor temperature 320 is less than the predetermined temperature, the adjustment module 436 may decrease the third adjustment 454. For example, the adjustment module 436 may adjust the third adjustment 454 toward or to a predetermined value that does not cause an adjustment of the third initial target opening 450. For example only, when a product of the third initial target opening 450 and the third adjustment 454 is used, the predetermined value may be 1.0. When a sum of the third initial target opening 450 and the third adjustment 454 is used, the predetermined value may be 0.0. As stated above, the predetermined temperature may be, for example, approximately 180 degrees Celsius (° C.)-approximately 200° C. or another suitable temperature above which a turbocharger may be damaged.

When the compressor temperature 320 is greater than the predetermined temperature, the adjustment module 436 may set the third adjustment 454 to increase the second target BPV opening 312. For example, when a product of the third initial target opening 450 and the third adjustment 454 is used, the adjustment module 436 may set the third adjustment 454 to greater than 1.0 to increase the second target BPV opening 312 and set the third adjustment 454 to less than 1.0 to cause decrease the second target BPV opening 312. When a sum of the third initial target opening 450 and the third adjustment 454 is used, the adjustment module 436 may set the third adjustment 454 to greater than 0.0 to increase the second target BPV opening 312 and set the third adjustment 454 to less than 0.0 to decrease the second target BPV opening 312.

The adjustment module 436 may increase the third adjustment 454 when the compressor temperature 320 is greater than the predetermined temperature. The adjustment module 436 may further increase the third adjustment 454 over time when the compressor temperature 320 remains greater than the predetermined temperature. Opening the second turbine bypass valve 176 enables more exhaust to bypass the second turbine 164 to decrease the compressor temperature 320.

Referring now to FIGS. 3A and 3B, in various implementations, the adjustment module 436 may begin increasing the first adjustment 440, decreasing the second adjustment 444, and/or increasing the third adjustment 454 when the compressor temperature 320 is increasing toward the predetermined temperature. The adjustment module 436 may increase the first adjustment 440, decrease the second adjustment 444, and/or increase the third adjustment 454, for example, when the compressor temperature 320 will be greater than or equal to the predetermined temperature within a predetermined period.

Figure 4:
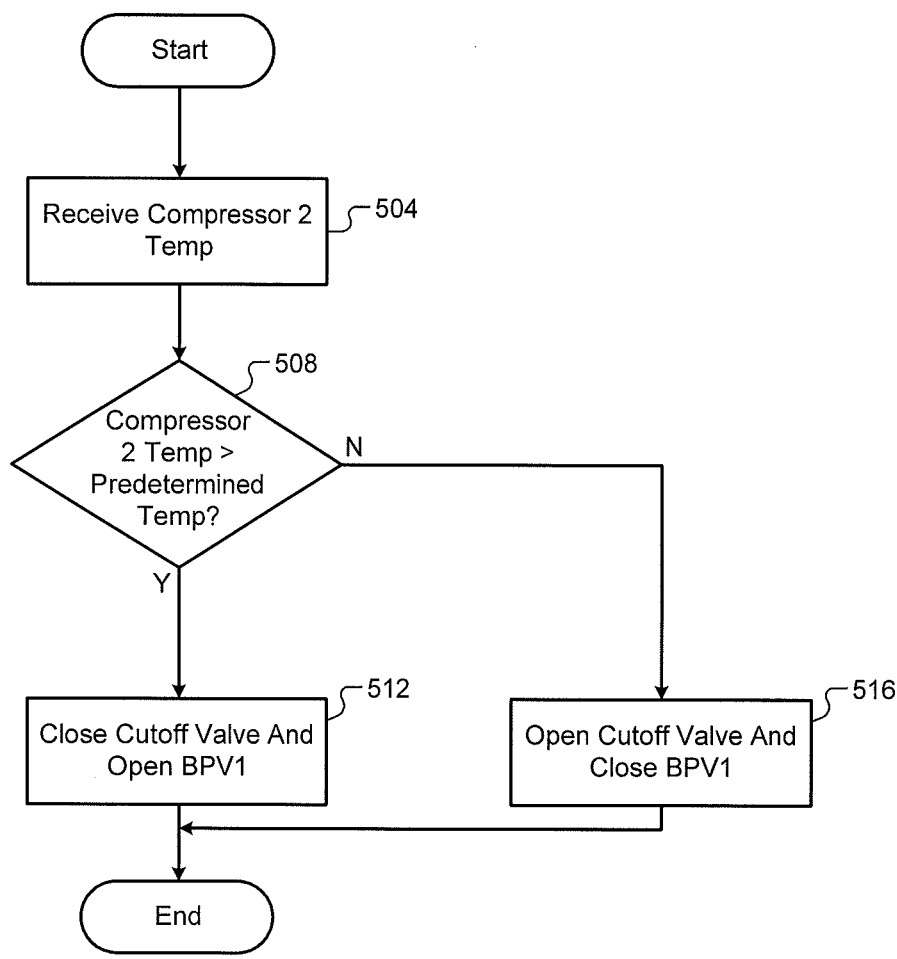
FIGS. 4 and 5 are flowcharts depicting example methods of controlling a temperature of a turbocharger compressor temperature according to the present disclosure.

Referring now to FIG. 4, a flowchart depicting an example method of controlling the temperature of the second compressor 168 is presented. As discussed above, the turbocharger control module 304 controls the first and second turbochargers sequentially. Control may begin with 504 when the one-way valve 184 is closed and the cutoff valve 196 is at least partially open. The second turbine 164 and the second compressor 168 are therefore spinning, and air at the outlet of the second compressor 168 is being recirculated back to the inlet of the second compressor 168.

At 504, the turbocharger control module 304 receives the compressor temperature 320. The compressor temperature 320 corresponds to a temperature of the second compressor 168. The compressor temperature 320 may be measured using a sensor or determined, for example, by the temperature module 324.

The turbocharger control module 304 may determine whether the compressor temperature 320 is greater than the predetermined temperature at 508. If 508 is true, control may continue with 512. If 508 is false, control may continue with 516. At 512, the turbocharger control module 304 closes the cutoff valve 196 and opens the first turbine bypass valve 172. For example only, the turbocharger control module 304 may close the cutoff valve 196 and open the first turbine bypass valve 172 by first and second predetermined amounts, respectively. The first and second predetermined amounts may be the same or different depending on characteristics of the cutoff valve 196 and the first turbine bypass valve 172. Closing the cutoff valve 196 and opening the first turbine bypass valve 172 decreases the speed of the second turbine 164 and the second compressor 168 and increases exhaust bypassing the first turbine 156 to cool the second compressor 168 and decrease the compressor temperature 320.

At 516, the turbocharger control module 304 may open the cutoff valve 196 and close the first turbine bypass valve 172. For example only, the turbocharger control module 304 may open the cutoff valve 196 and close the first turbine bypass valve 172 by third and fourth predetermined amounts, respectively. The third and fourth predetermined amounts may be the same or different depending on characteristics of the cutoff valve 196 and the first turbine bypass valve 172. Opening the cutoff valve 196 and closing the first turbine bypass valve 172 increases the speed of the second turbine 164 and the second compressor 168 in preparation for the second turbocharger to begin providing boost. While FIG. 4 is shown as ending after 512 or 516, FIG. 4 is illustrative of one control loop, and control loops may be performed at a predetermined rate.

Figure 5:
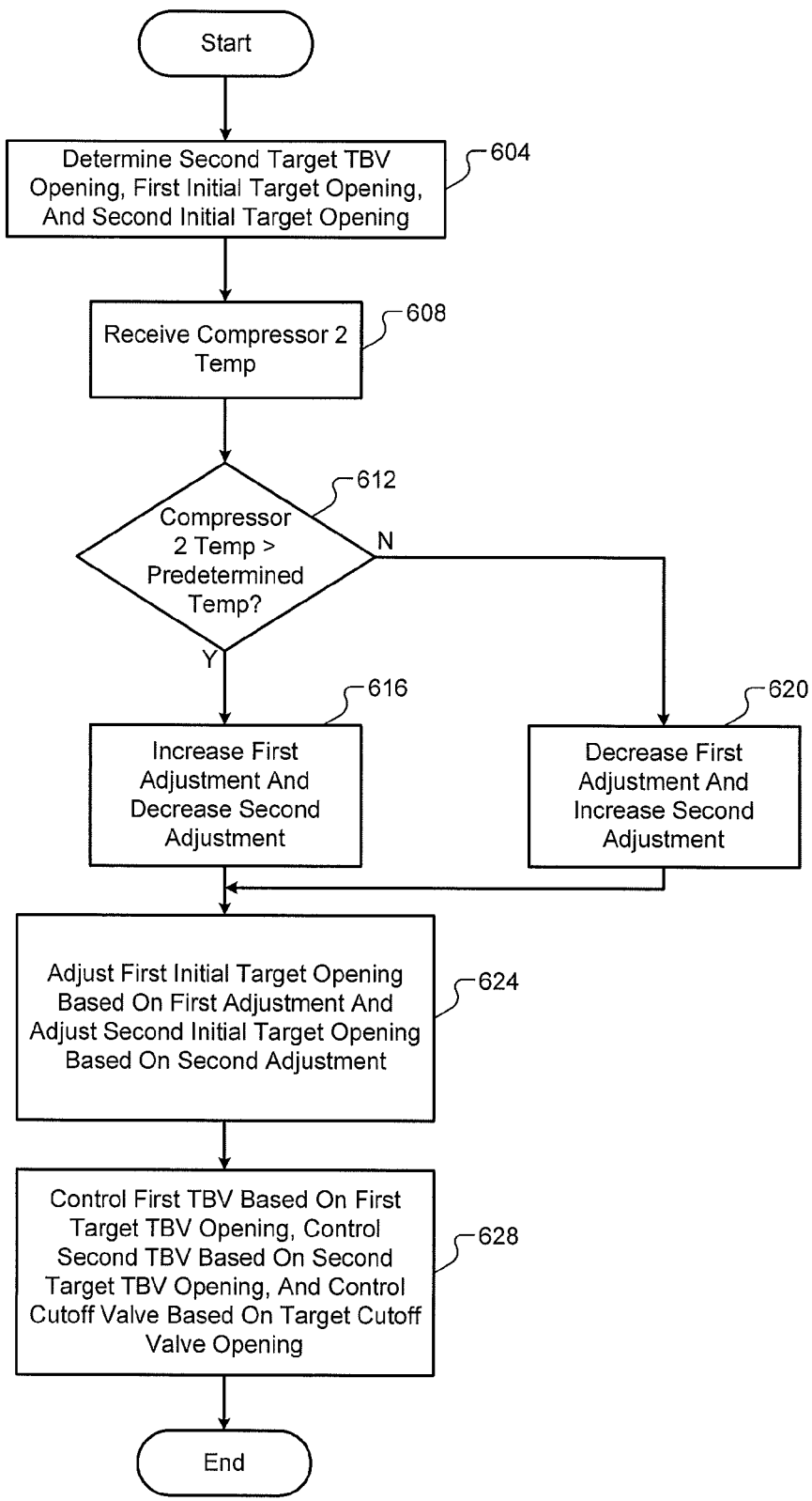

Referring now to FIG. 5, another flowchart depicting an example method of controlling the temperature of the second compressor 168 is presented. As discussed above, the turbocharger control module 304 controls the first and second turbochargers sequentially. Control may begin with 504 when the one-way valve 184 is closed and the cutoff valve 196 is at least partially open. The second turbine 164 and the second compressor 168 are therefore spinning, and air at the outlet of the second compressor 168 is being recirculated back to the inlet of the second compressor 168.

At 604, the boost control module 408 determines the second target BPV opening 312, the first initial target opening 428, and the second initial target opening 432. The boost control module 408 determines the second target BPV opening 312, the first initial target opening 428, and the second initial target opening 432 based on the target boost 424.

The adjustment module 436 receives the compressor temperature 320 at 608. The compressor temperature 320 corresponds to a temperature of the second compressor 168. The compressor temperature 320 may be measured using a sensor or determined, for example, by the temperature module 324. The adjustment module 436 may determine whether the compressor temperature 320 is greater than the predetermined temperature at 612. If 612 is true, control may continue with 616. If 612 is false, control may continue with 620.

At 616, the adjustment module 436 may increase the first adjustment 440 and decrease the second adjustment 444, and control continues with 624. Increasing the first adjustment 440 and decreasing the second adjustment 444 may close the cutoff valve 196 and open the first turbine bypass valve 172. For example only, the adjustment module 436 may increase the first adjustment 440 and decrease the second adjustment 444 by first and second predetermined amounts, respectively. The first and second predetermined amounts may be the same or different depending on characteristics of the cutoff valve 196 and the first turbine bypass valve 172.

At 620, the adjustment module 436 may decrease the first adjustment 440 and increase the second adjustment 444, and control continues with 624. Decreasing the first adjustment 440 and increasing the second adjustment 444 may close the first turbine bypass valve 172 and open the cutoff valve 196. For example only, the adjustment module 436 may decrease the first adjustment 440 and increase the second adjustment 444 by third and fourth predetermined amounts, respectively. The third and fourth predetermined amounts may be the same or different depending on characteristics of the cutoff valve 196 and the first turbine bypass valve 172.

At 624, the first adjusting module 412 adjusts the first initial target opening 428 based on the first adjustment 440 to produce the first target BPV opening 308, and the second adjusting module 416 adjusts the second initial target opening 432 based on the second adjustment 444 to produce the target cutoff valve opening 316. For example, the first adjusting module 412 may set the first target BPV opening 308 equal to a sum or a product of the first initial target opening 428 and the first adjustment 440. The second adjusting module 416 may set the target cutoff valve opening 316 equal to a sum or a product of the second initial target opening 432 and the second adjustment 444.

At 628, the boost actuator module 200 controls the first turbine bypass valve 172 based on the first target BPV opening 308, controls the second turbine bypass valve 176 based on the second target BPV opening 312, and controls the cutoff valve 196 based on the target cutoff valve opening 316. While FIG. 5 is shown as ending after 628, FIG. 5 is illustrative of one control loop, and control loops may be performed at a predetermined rate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A control system for a vehicle, comprising:
    a target boost module that determines a target boost for first and second turbochargers based on an engine torque request;
    a turbocharger control module that, based on a temperature of a compressor of the second turbocharger:
        selectively opens a first bypass valve that regulates exhaust bypassing a first turbine of the first turbocharger; and
        selectively closes a cutoff valve that regulates exhaust flow through both a second turbine of the second turbocharger and a second bypass valve,
        wherein the second bypass valve regulates exhaust bypassing the second turbine of the second turbocharger.

2. The control system of claim 1 wherein, when the temperature of the compressor of the second turbocharger is greater than a predetermined temperature, the turbocharger control module:
    selectively opens the first bypass valve; and
    selectively closes the cutoff valve.

3. The control system of claim 2 wherein, when the temperature of the compressor of the second turbocharger is greater than the predetermined temperature, the turbocharger control module:
    opens the first bypass valve by a first predetermined amount; and
    closes the cutoff valve by a second predetermined amount.

4. The control system of claim 2 wherein, when the temperature of the compressor of the second turbocharger is less than the predetermined temperature, the turbocharger control module:
    selectively closes the first bypass valve; and
    selectively opens the cutoff valve.

5. The control system of claim 4 wherein, when the temperature of the compressor of the second turbocharger is less than the predetermined temperature, the turbocharger control module:

closes the first bypass valve by a third predetermined amount; and selectively opens the cutoff valve by a fourth predetermined amount.

6. The control system of claim 1 wherein, when the cutoff valve is at least partially open and the temperature of the compressor of the second turbocharger is greater than a predetermined temperature, the turbocharger control module:

selectively opens the first bypass valve; and
selectively closes the cutoff valve.

7. The control system of claim 1 wherein the turbocharger control module:

generates first, second, and third target openings based on the target boost;
generates first and second adjustments based on the temperature of the compressor of the second turbocharger;
generates a fourth target opening based on the first target opening and the first adjustment;
generates a fifth target opening based on the second target opening and the second adjustment; and
controls the first bypass valve, the cutoff valve, and the second bypass valve based on the fourth target opening, the fifth target opening, and the third target opening, respectively.

8. The control system of claim 7 wherein, when the temperature of the compressor is greater than a predetermined temperature, the turbocharger control module selectively increases the first adjustment and decreases the second adjustment.

9. The control system of claim 8 wherein, when the temperature of the compressor is less than the predetermined temperature, the turbocharger control module selectively decreases the first adjustment and increases the second adjustment.

10. The control system of claim 7 wherein the turbocharger control module:

sets the fourth target opening equal to one of a product of and a sum of the first target opening and the first adjustment; and
sets the fifth target opening equal to one of a product of and a sum of the second target opening and the second adjustment.

11. A control method for a vehicle, comprising:

determining a target boost for first and second turbochargers based on an engine torque request; and,
based on a temperature of a compressor of the second turbocharger:
selectively opening a first bypass valve that regulates exhaust bypassing a first turbine of the first turbocharger; and
selectively closing a cutoff valve that regulates exhaust flow through both a second turbine of the second turbocharger and a second bypass valve,
wherein the second bypass valve regulates exhaust bypassing the second turbine of the second turbocharger.

12. The control method of claim 11 further comprising, when the temperature of the compressor of the second turbocharger is greater than a predetermined temperature:

selectively opening the first bypass valve; and
selectively closing the cutoff valve.

13. The control method of claim 12 further comprising, when the temperature of the compressor of the second turbocharger is greater than the predetermined temperature:

opening the first bypass valve by a first predetermined amount; and
closing the cutoff valve by a second predetermined amount.

14. The control method of claim 12 further comprising, when the temperature of the compressor of the second turbocharger is less than the predetermined temperature:

selectively closing the first bypass valve; and
selectively opening the cutoff valve.

15. The control method of claim 14 further comprising, when the temperature of the compressor of the second turbocharger is less than the predetermined temperature:

closing the first bypass valve by a third predetermined amount; and
selectively opening the cutoff valve by a fourth predetermined amount.

16. The control method of claim 11 further comprising, when the cutoff valve is at least partially open and the temperature of the compressor of the second turbocharger is greater than a predetermined temperature:

selectively opening the first bypass valve; and
selectively closing the cutoff valve.

17. The control method of claim 11 further comprising:

generating first, second, and third target openings based on the target boost;
generating first and second adjustments based on the temperature of the compressor of the second turbocharger;
generating a fourth target opening based on the first target opening and the first adjustment;
generating a fifth target opening based on the second target opening and the second adjustment; and
controlling the first bypass valve, the cutoff valve, and the second bypass valve based on the fourth target opening, the fifth target opening, and the third target opening, respectively.

18. The control method of claim 17 further comprising, when the temperature of the compressor is greater than a predetermined temperature, selectively increasing the first adjustment and decreasing the second adjustment.

19. The control method of claim 18 further comprising, when the temperature of the compressor is less than the predetermined temperature, selectively decreasing the first adjustment and increasing the second adjustment.

20. The control method of claim 17 further comprising:

setting the fourth target opening equal to one of a product of and a sum of the first target opening and the first adjustment; and
setting the fifth target opening equal to one of a product of and a sum of the second target opening and the second adjustment.

* * * * *